(12) United States Patent
Watanabe et al.

(10) Patent No.: US 10,866,140 B2
(45) Date of Patent: Dec. 15, 2020

(54) SPECTROPHOTOMETER (71) Applicant: SHIMADZU CORPORATION, Kyoto (JP)

(72) Inventors: Masato Watanabe, Kyoto (JP); Masahide Gunji, Kyoto (JP)

(73) Assignee: Shimadzu Corporation, Koyto (JP)

( * ) Notice: Subject to any disclaimer, the term of this patent is extended or adjusted under 35 U.S.C. 154(b) by 0 days.

(21) Appl. No.: 16/604,995

(22) PCT Filed: Apr. 20, 2017

(86) PCT No.: PCT/JP2017/015859
§ 371 (c)(1),
(2) Date: Oct. 12, 2019

(87) PCT Pub. No.: WO2018/193572
PCT Pub. Date: Oct. 25, 2018

(65) Prior Publication Data
US 2020/0158571 A1 May 21, 2020

(51) Int. Cl.
G01J 3/28 (2006.01)
G01J 3/04 (2006.01)
(Continued)

(52) U.S. Cl.
CPC .............. *G01J 3/2803* (2013.01); *G01J 3/04* (2013.01); *G01J 3/10* (2013.01); *G01J 3/42* (2013.01); *G01J 2003/425* (2013.01)

(58) Field of Classification Search
CPC .................................................... G01J 3/2803
(Continued)

(56) References Cited

U.S. PATENT DOCUMENTS 6,610,732 B2 * 8/2003 Ueno ................ A61P 1/12
514/432
2002/0080352 A1 * 6/2002 Bungo ............... G01J 3/10
356/319

(Continued)

FOREIGN PATENT DOCUMENTS

JP S63-236929 A 10/1988
JP H08-279623 A 10/1996
(Continued)

OTHER PUBLICATIONS

International Search Report for corresponding Application No. PCT/JP2017/015859, dated Jul. 18, 2017.
(Continued)

*Primary Examiner* — Tarifur R Chowdhury
*Assistant Examiner* — Omar H Nixon
(74) *Attorney, Agent, or Firm* — Renner, Otto, Boisselle & Sklar, LLP (57) ABSTRACT Provided is a spectrophotometer having a positional relationship between the spectroscope and a PDA that is set to have a distance between a reflection position of light reflected on a light receiving surface of a corresponding one of PDs constituting the PDA, being configured to receive at least light having a wavelength of from 200 nm to 300 nm, and an incident position at which light reflected at the reflection position is incident on a light receiving surface of the PDA after being re-reflected on the protective plate, the distance being equal to or less than a width dimension of any one of the PDs constituting the PDA.

8 Claims, 7 Drawing Sheets (51) Int. Cl.
*G01J 3/10* (2006.01)
*G01J 3/42* (2006.01)

(58) Field of Classification Search
USPC .......................................................... 356/328
See application file for complete search history.

(56) References Cited

U.S. PATENT DOCUMENTS

| | | | |
|---|---|---|---|
| 2003/0040528 A1* | 2/2003 | Ueno ........................ | A61P 1/12 514/302 |
| 2007/0297718 A1 | 12/2007 | Oikawa | |
| 2008/0218761 A1* | 9/2008 | Nishikawa ........... | G01N 21/554 356/445 |
| 2010/0003289 A1* | 1/2010 | Woo ........................ | A61K 45/06 424/400 |
| 2010/0118299 A1 | 5/2010 | Thevenon | |
| 2010/0230355 A1* | 9/2010 | Kerr ........................ | G01N 30/38 210/657 |
| 2011/0175185 A1* | 7/2011 | Asher ............... | H01L 27/14621 257/432 |
| 2012/0127470 A1* | 5/2012 | Chumachenko ... | G01N 21/0303 356/440 |
| 2014/0063496 A1 | 3/2014 | Owa | |
| 2015/0362366 A1* | 12/2015 | Tsuji ........................ | G01J 3/18 356/72 |
| 2016/0121326 A1* | 5/2016 | Lebedev ................ | G01N 33/15 436/57 |
| 2016/0313248 A1* | 10/2016 | Nagai .................. | G01N 21/645 |
| 2018/0031423 A1 | 2/2018 | Gunji | |

FOREIGN PATENT DOCUMENTS

| | | |
|---|---|---|
| JP | 2008-002914 A | 1/2008 |
| JP | 2010-520445 A | 6/2010 |
| JP | 2014-048176 A | 3/2014 |
| WO | 2016-129033 A1 | 8/2016 |

OTHER PUBLICATIONS

Written Opinion for corresponding Application No. PCT/JP2017/015859, dated Jul. 18, 2017.
Office Action for corresponding Japanese Application No. 2019-513155 dated May 12, 2020, with English translation.

* cited by examiner

Y-AXIS DIRECTION
(ORTHOGONAL TO X-AXIS DIRECTION)

SPECTROPHOTOMETER

TECHNICAL FIELD

The present invention relates to a spectrophotometer that separates light from a flow cell for each wavelength component using a spectroscope and detects light dispersed for each of the wavelength components using a photodiode array (referred to below as a PDA).

BACKGROUND ART

Known PDA spectrophotometers include a liquid chromatograph detector. A PDA spectrophotometer is configured in such a way that a flow cell through which a solution containing a sample is circulated is irradiated with light emitted from a light source, and that a spectroscope, such as a diffraction grating or a prism, disperses light having passed through the flow cell or reflected (or refracted) on the flow cell for each of the wavelength components and guides the light into the PDA. The PDA includes a plurality of photodiodes (referred to below as PDs) for receiving light of the respective wavelength components dispersed by the spectroscope, so that a wavelength spectrum of light having passed through the flow cell can be detected by simultaneously detecting light for each of the wavelength components with the corresponding one of the PDs (refer to Patent Document 1).

PRIOR ART DOCUMENT

Patent Document

Patent Document 1: Japanese Patent Laid-open Publication No. 2014-048176

SUMMARY OF THE INVENTION

Problems to be Solved by the Invention

The spectrophotometer as described above has a problem that a part of light incident on the PDA, being dispersed by the spectroscope, is reflected, and a part of the reflected light is re-reflected on a protective plate protecting a light receiving surface of the PDA, the spectroscope, or the like, to be incident on the PDA again as stray light. The stray light means light incident on a PD different from that in which the light is originally to be detected. This kind of stray light causes decreasing in detection sensitivity and deterioration in linearity.

The present invention is made in light of this kind of problem, and an object of the present invention is to reduce influence on detection, due to re-reflection of light reflected on a light receiving surface of a PDA.

Solutions to the Problems

A first spectrophotometer according to the present invention is a spectrophotometer serving as a liquid chromatograph detector, including: a light source; a flow cell in which a sample flows, the flow cell being disposed in an optical path of light from the light source; a spectrometer for dispersing light which passed through the flow cell for each wavelength component; a PDA provided with a plurality of PDs for detecting the amount of incident light, the plurality of photodiodes are aligned in one direction, the PDA being disposed to allow light for each of the wavelength components dispersed by the spectroscope to be incident on a light receiving surface of the corresponding one of the PDs; and an optically transparent protective plate protecting a light receiving surface of the PDA. A positional relationship between the spectroscope and the PDA is set so that a distance between a reflection position of light reflected on the light receiving surfaces of the PDs which receive at least light whose wavelength is from 200 nm to 300 nm, and an incident position at which light reflected at the reflection position is incident on the light receiving surface of the PDA after being re-reflected on the protective plate is equal to or less than a width dimension of any one of the PDs constituting the PDA, or is equal to or less than minimum spectrum resolution of the spectrophotometer.

That is, the first spectrophotometer of the present invention is designed to minimize the amount of stray light within a wavelength range of from 200 nm to 300 nm, which is most often used in liquid chromatographs. A general spectrophotometer using a PDA is designed to enable accurate detection in a wide wavelength range (e.g., 190 nm to 800 nm). Unfortunately, a spectrophotometer designed as described above does not fully eliminate an effect of stray light caused by light re-reflected by a protective plate within the wavelength range of from 200 nm to 300 nm, which is most often used in liquid chromatographs. Increase in the amount of stray light increases a ratio of stray light incident on the PDA increases when absorbance of a sample component increases, for example, and thus, detection accuracy (linearity) deteriorates. This results in causing a problem that a spectrum shape is broken and a peak wavelength is also changed in some cases.

The first spectrophotometer of the present invention is designed to have a difference between a reflection position (first incident position) on the light receiving surface of the PDA and a re-incident position (second incident position) of light reflected at the reflection position in the wavelength range of from 200 nm and 300 nm, which is most often used in liquid chromatographs, the difference being less than the width dimension of any one of the PDs or less than the minimum spectrum resolution of the spectrophotometer. Thus, within the wavelength range, the first and second incident positions of light on the PDA are likely to fall within a range of the PDs for detecting light within the same wavelength range, so that the amount of stray light in the wavelength range is reduced.

Here, increase in an incident angle of light incident on the light receiving surface of the PDA increases a reflection angle of light on the light receiving surface of the PDA, so that a difference between the first incident position and the second incident position also increases. Thus, in a preferred embodiment of the first spectrophotometer according to the present invention, the positional relationship between the spectroscope and the PDA is set to allow an optical axis of light having a predetermined wavelength of from 200 nm to 300 nm among light dispersed by the spectroscope to be orthogonal to the one direction (array direction of the PDs), i.e., to have an incident angle of 0 degree. Accordingly, an incident angle of light incident on the PDs for detecting light having a wavelength of from 200 nm to 300 nm decreases.

The predetermined wavelength is, for example, about 250 nm, for example. About 250 nm means near 250 nm and means a wavelength near the center of the wavelength range of from 200 nm to 300 nm.

In addition, light having reached the spectroscope after being reflected on the light receiving surface of the PDA light is re-incident on the PDA after being re-reflected on the spectroscope to become stray light, so that the stray light can be reduced by suppressing re-reflection on the spectroscope. Thus, in the first spectrophotometer according to the present invention, the positional relationship between the spectroscope and the PDA is preferably set in addition to the above-described configuration to allow an optical axis of light dispersed by the spectroscope to incline (an incident angle is not 0 degree) from the direction orthogonal to the one direction (array direction of the PDs) in a plane of the light receiving surface of the PDA to allow light reflected on the light receiving surface of the PDA to deviate from the spectroscope. Accordingly, the light reflected on the light receiving surface of the PDA is prevented from being re-reflected on the spectroscope to be re-incident on the PDA, so that stray light can be reduced.

In a further preferred embodiment of the first spectrophotometer according to the present invention, an anti-reflection coating for reducing a reflectance is applied to at least one of the light receiving surfaces of the PDA, a surface of the protective plate close to the PDA, and a surface of the protective plate opposite to the PDA. When the anti-reflection coating is applied to the light receiving surface of the PDA, the amount of light reflected on the light receiving surface of the PDA is reduced, and thus, light re-incident on the PDA is also reduced to reduce stray light. When the anti-reflection coating is applied to the surface of the protective plate close to the PDA, or the surface of the protective plate opposite to the PDA, a ratio of light re-reflected on the protective plate among light reflected on the PDA is reduced, and thus, light re-incident on the PDA is also reduced to reduce stray light.

A second spectrophotometer according to the present invention is a spectrophotometer as a detector for a liquid chromatograph having the same basic configuration as the first spectrophotometer according to the present invention described above, and a positional relationship between the spectroscope and the PDA that is set so that an optical axis of light dispersed by the spectroscope is inclined (an incident angle is not 0 degree) from the direction orthogonal to the one direction (array direction of the PDs) in a plane of the light receiving surface of the PDA to allow light reflected on the light receiving surface of the PDA to deviate from the spectroscope.

In addition, providing an inlet slit in an optical path of light incident on the spectrometer causes a problem that when light, such as minus first order light generated by the spectrometer, is reflected on the inlet slit and returns to the spectrometer, the light is incident on the PDA as stray light. Thus, in the spectrophotometer of the present invention, a positional relationship between the inlet slit and the spectroscope is preferably set so that light from the spectroscope reflected on the inlet slit deviates from the spectroscope.

Effects of the Invention

The first spectrophotometer of the present invention is designed to have a difference between the first incident position on the light receiving surface of the PDA and the second incident position of light re-reflected at the first incident position in the wavelength range of from 200 nm and 300 nm, which is most often used in liquid chromatographs, the difference being less than the width dimension of any one of the PDs or less than the minimum spectrum resolution of the spectrophotometer. Thus, within the wavelength range, the first and second incident positions of light on the PDA are likely to fall within a range of the PDs for detecting light within the same wavelength range, so that the amount of stray light is reduced. Accordingly, as compared with conventional spectrophotometers, detection accuracy within the wavelength range of from 200 nm to 300 nm, which is most often used in liquid chromatographs, can be improved.

The second spectrophotometer according to the present invention has the positional relationship between the spectroscope and the PDA that is set so that an optical axis of light dispersed by the spectroscope has an angle from the direction orthogonal to the array direction of the PDs in a plane of the light receiving surface of the PDA. Thus, light reflected on the light receiving surface of the PDA is prevented from being re-reflected on the spectroscope to be re-incident on the PDA, so that stray light is reduced. Accordingly, detection accuracy is improved.

Likewise, when the inlet slit is provided in the optical path of light incident on the spectrometer, the positional relationship between the inlet slit and the spectrometer is set so that light from the spectrometer reflected on the slit deviates from the spectrometer. Thus, the light reflected on the inlet slit is prevented from being re-reflected on the spectrometer to be re-incident on the PDA, so that stray light is reduced. Accordingly, detection accuracy is improved.

EMBODIMENTS OF THE INVENTION

An embodiment of a spectrophotometer as a liquid chromatograph detector according to the present invention will be described below with reference to the drawings.

Figure 1:
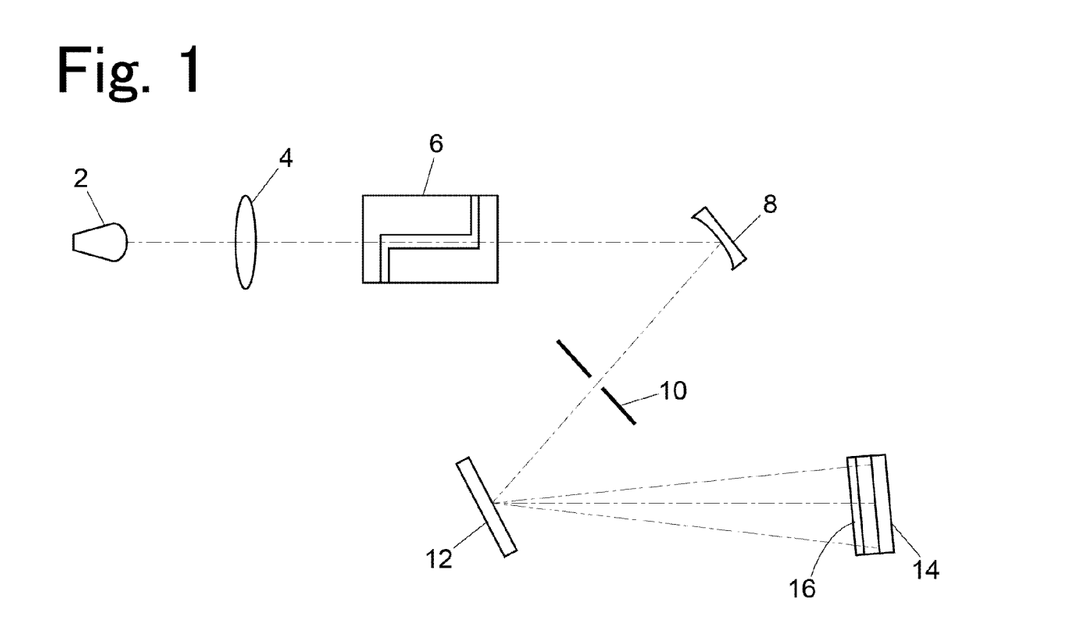
FIG. 1 is a configuration diagram illustrating an embodiment of a spectrophotometer.

First, a configuration of the embodiment of the spectrophotometer will be described with reference to the schematic configuration diagram of FIG. 1.

The spectrophotometer of the present embodiment includes a light source 2, a condensing lens 4, a flow cell 6, a mirror 8, an inlet slit 10, a spectroscope 12, and a photodiode array (hereinafter referred to as PDA) 14.

The condenser lens 4 and the flow cell 6 are disposed in an optical path of light emitted from the light source 2, so that the flow cell 6 is irradiated with light from the light source 2 through the condenser lens 4. In the flow cell 6, a solution having passed through a separation column of a liquid chromatograph flows.

The mirror 8 is disposed so as to reflect light having passed through the flow cell 6 and guide the light toward the inlet slit 10, and the light having passed through the inlet slit 10 is guided to the spectroscope 12 such as to a diffraction grating. The light guided to the spectroscope 12 is dispersed into light of each wavelength component, and the dispersed light is incident on a corresponding one of a plurality of photodiodes (referred to below as PDs) arrayed in the PDA 14.

Figure 6:
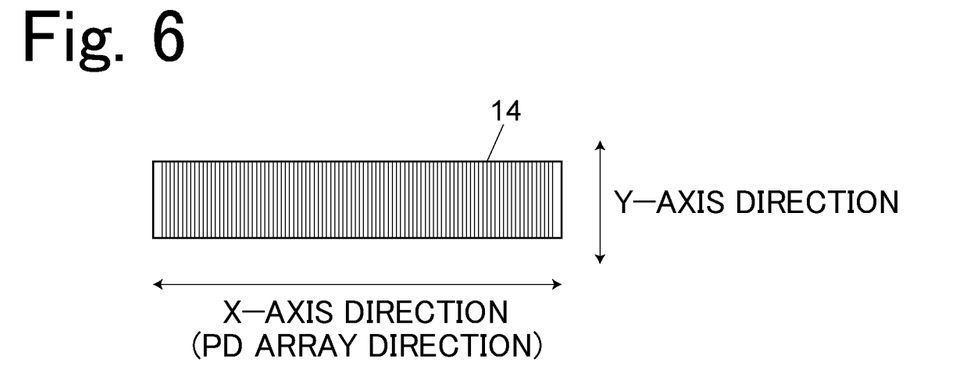
FIG. 6 is a diagram for illustrating definitions of an X-axis direction and a Y-axis direction with respect to the PDA.

In the present specification, as illustrated in FIG. 6, a direction parallel to a PD array direction in the same plane as a light receiving surface of the PDA 14 is defined as X-axis direction, and a direction orthogonal the X-axis direction in the same plane is defined as Y-axis direction. FIG. 6 is a plan view of the light receiving surface of the PDA 14.

Figure 2:
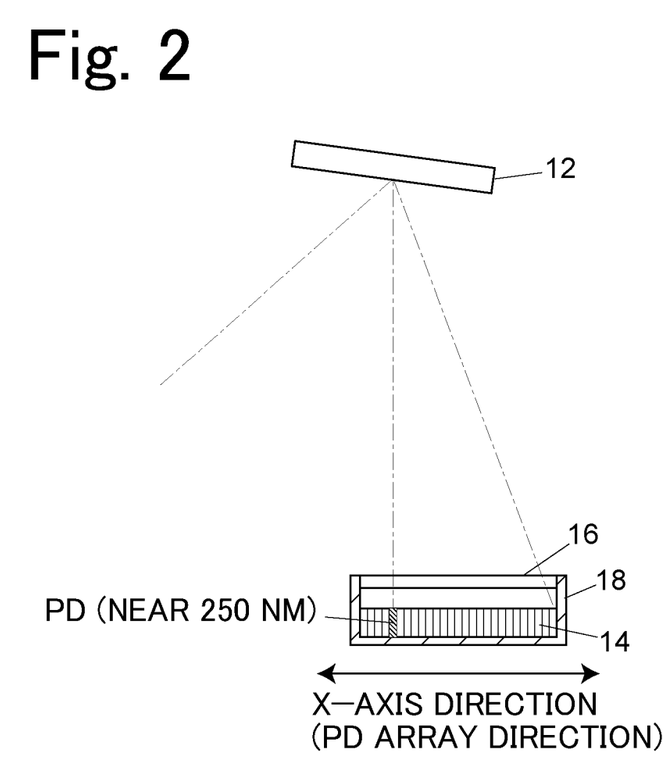
FIG. 2 is a diagram illustrating a positional relationship between a spectroscope and a PDA in a PD array direction (X-axis direction) in the embodiment.

As illustrated in FIG. 2, the PDA 14 is fixed in a PDA case 18 having an opening surface in such a way that the light receiving surface faces toward the opening surface of the PDA case 18. The opening surface of the PDA case 18 is closed by a transparent protective plate 16, and the light receiving surface of the PDA 14 is protected by the protective plate 16. As described above, the PDA 14 and the protective plate 16 are configured as one package. Such a PDA package configuration is common.

The protective plate 16 disposed on a light receiving surface side of the PDA 14 causes a problem that a part of light reflected on the light receiving surface of the PDA 14 is re-reflected on the protective plate 16, and the re-reflected light returns toward the PDA 14 and is re-incident on a PD for detecting a wavelength different from that of the re-reflected light to become stray light.

The spectrophotometer of the present embodiment is designed to minimize influence of stray light due to re-reflection on the protective plate 16 within the wavelength range of from 200 nm to 300 nm, which is most often used in liquid chromatographs. Specifically, a positional relationship between the spectroscope 12 and the PDA 14 is set to allow an optical axis of light having a wavelength component of near 250 nm to be orthogonal to the X-axis direction (PD array direction) among light dispersed by the spectroscope 12, having individual wavelength components. That is, as illustrated in FIG. 2 in which a left-right direction in the drawing is defined as the X-axis direction (PD arrangement direction), the positional relationship between the spectroscope 12 and the PDA 14 is set to allow light having a wavelength component of near 250 nm to travel vertically to be incident perpendicularly on the PDA 14.

Figure 3:
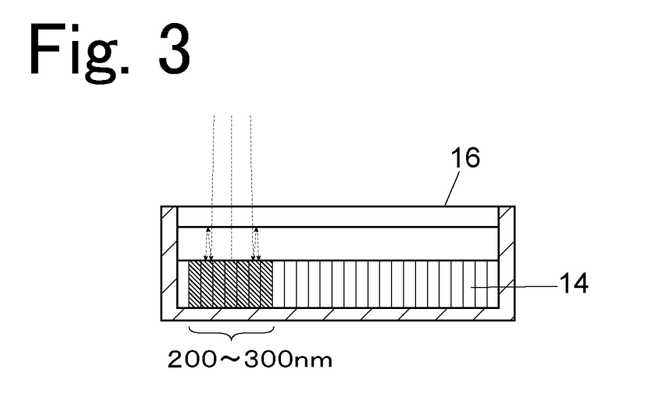
FIG. 3 is a conceptual diagram illustrating an example of behavior of light incident on the PDA of the embodiment and reflected on a light receiving surface.

When the spectrophotometer is designed to allow light having a wavelength component of near 250 nm to be incident perpendicularly on the light receiving surface of the PDA 14, an incident angle of light to be incident on PDs for detecting light within the wavelength range of from 200 nm to 300 nm to the X-axis direction decreases as illustrated in FIG. 3. As a result, a reflection angle of light on the light receiving surface of the PDA 14 is very small within the wavelength range of from 200 nm to 300 nm, so that a distance between a first incident position of light on the PDA 14 (before reflection), and a second incident position of light after being re-reflected on the protective plate 16, on the PDA 14, can be set to equal to or less than resolution of the PDA 14, i.e., a width dimension of one PD in the X-axis direction, or the minimum spectrum resolution of the spectrophotometer. As indicated by arrows in FIG. 3, this configuration increases probability that light reflected on the light receiving surface of the PDA 14 and re-reflected on the protective plate 16 returns to the PD on which the light is originally to be incident within the wavelength range of from 200 nm to 300 nm, so that stray light is reduced.

A conventional configuration is not designed to most reduce stray light within the wavelength range of from 200 nm to 300 nm unlike the present embodiment, and is designed to allow light to be perpendicularly incident on a PD for receiving light having a longer wavelength. For this reason, an incident angle of light on the PD for receiving light having a wavelength of 200 nm to 300 nm increases, and a reflection angle also increases. Thus, light re-reflected on the protective plate 16 is incident on a PD different from the PD on which the re-reflected light is to be originally incident, and becomes stray light.

As an example, when light is perpendicularly incident on a PD corresponding to a wavelength of 800 nm, light is incident on a PD corresponding to a wavelength of 250 nm at an incident angle of about 16 degrees. As a result, when light reflected on the light receiving surface of the PD corresponding to a wavelength of 250 nm is re-reflected on the protective plate 16, the re-reflected light is re-incident on a PD on a short wavelength side at a position shifted by about 0.56 mm from a first incident position.

In contrast, when a spectrophotometer is designed to allow light to be perpendicularly incident on the PD corresponding to a wavelength of 250 nm, an incident angle of light on PDs corresponding to respective wavelengths of 200 nm and 300 nm is about 1 degree. Thus, even when the light reflected on light receiving surfaces of the respective PDs is re-reflected on the protection plate 16 and the re-reflected light is re-incident on the PDA 14, a distance between a first incident position and a second incident position is about 1 nm. The distance is smaller than a width dimension of one PD element of the PDA 14 or the minimum spectrum resolution (e.g., about 1.4 nm) of the spectrophotometer. This means that the first incident position and the second incident position fall in the same band width.

Figure 8:
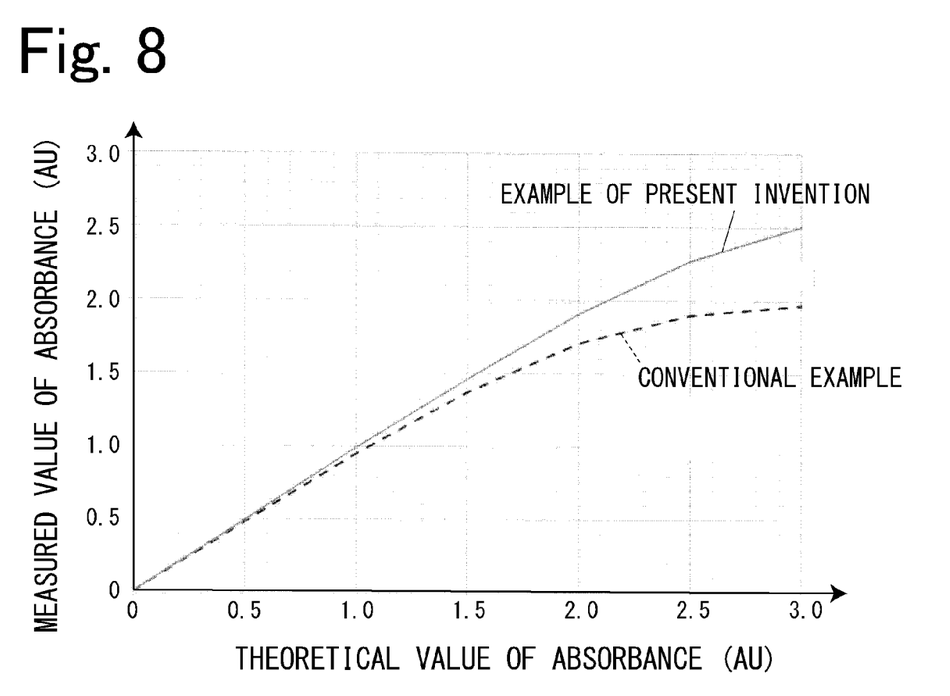
FIG. 8 is a graph showing verification results of an effect of improving linearity in an embodiment in which stray light is reduced.
Figure 9A:
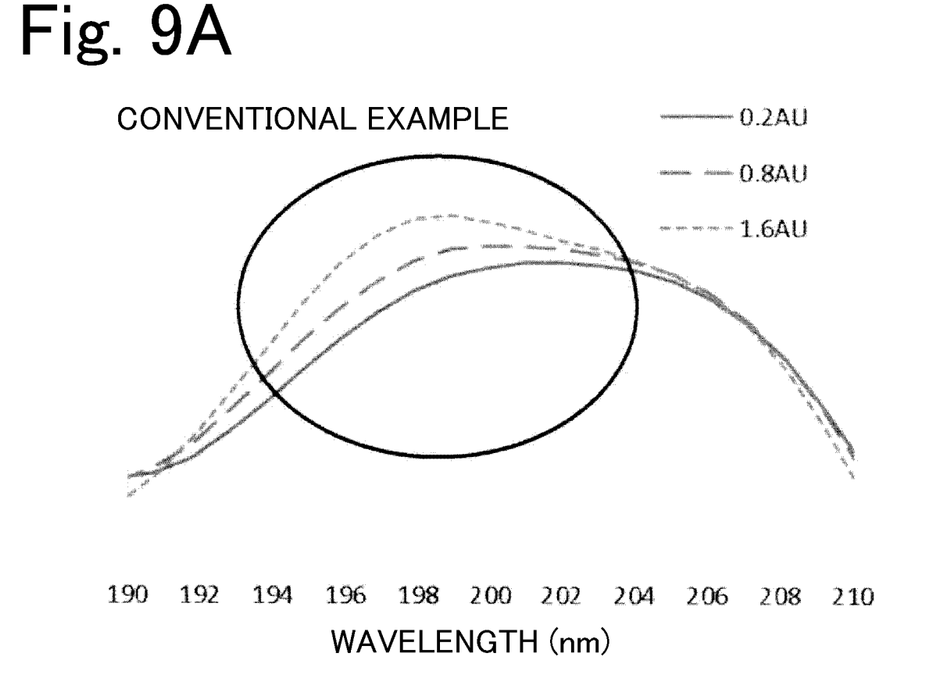
FIG. 9A shows an example of a peak waveform at each absorbance when absorbance measurement is performed using a conventional device configuration.
Figure 9B:
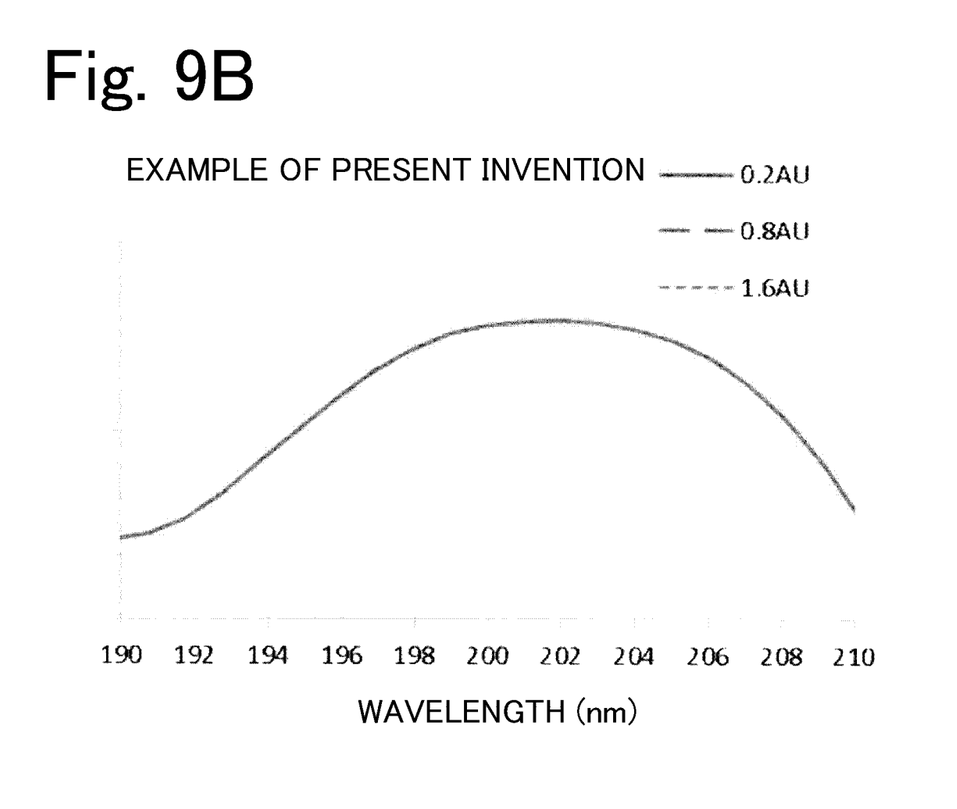
FIG. 9B shows an example of a peak waveform at each absorbance when absorbance measurement is performed using a device configuration of the embodiment.

FIGS. 8, 9A, and 9B each show verification results of influence on detection accuracy due to reduction in stray light with the present embodiment. In FIG. 8, the vertical axis represents a measured value (AU) of absorbance, and the horizontal axis represents a theoretical value (AU) of absorbance. In the graph of FIG. 8, it can be said that as measured values of absorbance are closer to theoretical values, a graph shape is closer to a straight line to increase measurement accuracy.

As shown in FIG. 8, influence of stray light increases as the absorbance increases in a conventional example in which influence of stray light due to re-reflection on the protective plate 16 is not considered, so that the measured values deviate from the theoretical values to deteriorate linearity. In contrast, in the example of the present invention in which influence of stray light due to re-reflection on the protective plate 16 is reduced, the measured values are close to the theoretical values even when the absorbance increases, so that linearity is maintained compared to the conventional example.

In addition, while a peak waveform deforms as the absorbance increases in the conventional example in which influence of stray light due to re-reflection on the protective plate 16 is not considered as shown in FIG. 9A, reducing stray light with the configuration of the example does not cause deformation of the peak waveform even when the absorbance increases as shown in FIG. 9B.

Accordingly, reducing a stray light component within the wavelength range of from 200 nm to 300 nm with the configuration of the above example enables improving detection accuracy within the wavelength range above, so that the spectrophotometer can be more suitable for a liquid chromatograph detector.

Figure 4A:
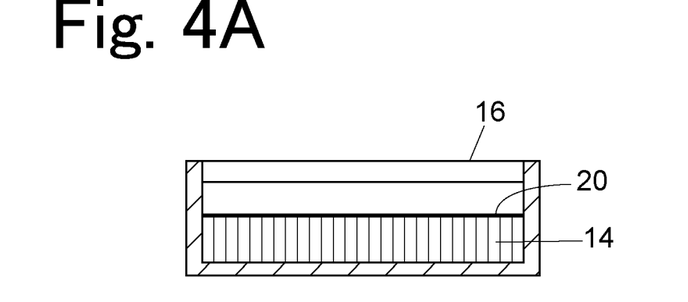
FIG. 4A is a diagram illustrating an anti-reflection coating applied to the light receiving surface of the PDA of the embodiment.
Figure 4B:
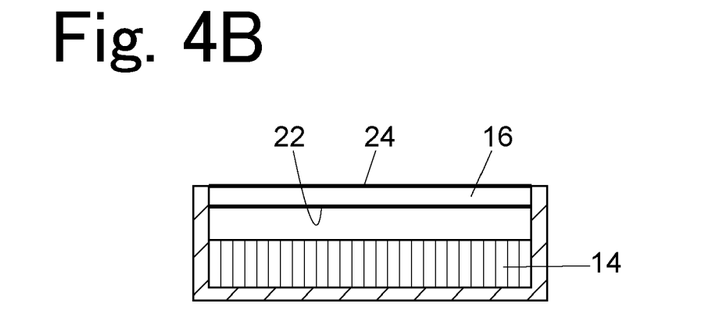
FIG. 4B is a diagram illustrating anti-reflection coatings applied to both surfaces of a protective plate for protecting the PDA of the embodiment.

To further reduce stray light, an anti-reflection coating 20 such as an AR coating for reducing a reflectance of the light receiving surface of the PDA 14 can be provided as illustrated in FIGS. 4A and 4B. Accordingly, the amount of light reflected on the light receiving surface of the PDA 14 is reduced, so that the amount of light re-incident on the PDA 14 after being re-reflected on the protection plate 16 is reduced, and thus, stray light is reduced. In addition, as illustrated in FIG. 4B, anti-reflection coatings 22 and 24 such as AR coatings may be provided on a surface of the protective plate 16 on a PDA 14 side and a surface opposite to the PDA 14, respectively. Accordingly, the amount of light re-reflected on the protection plate 16 is reduced, so that stray light is reduced.

While the anti-reflection coatings 22 and 24 are provided on the respective surfaces of the protective plate 16 in FIG. 4B, an anti-reflection coating may be provided only on any one of the surfaces. In addition, the anti-reflection coatings 22 and/or 24 may be provided on the respective surfaces of the protective plate 16 or on any one of the surfaces thereof along with the anti-reflection coating 20 provided on the light receiving surface of the PDA 14.

While the configuration described above reduces stray light due to re-reflection on the protection plate 16 protecting the PDA 14, the protection plate 16 is not the only cause of stray light incident on the PDA 14. The present inventors have knowledge that light reflected on the light receiving surface of the PDA 14 or the surface of the protective plate 16 toward the spectroscope 12 is dispersed by the spectroscope 12, and the dispersed light is re-incident on the PDA 14 to become stray light.

While conventional spectrophotometers each typically have placement in which the Y-axis direction (PD arrangement direction) of the light receiving surface of the PDA 14 is orthogonal to the optical axis of light from the spectroscope 12, such a structure may cause light reflected on the surface of the PDA 14 or the protection plate 16 to return toward the spectroscope 12 to become stray light.

Figure 5:
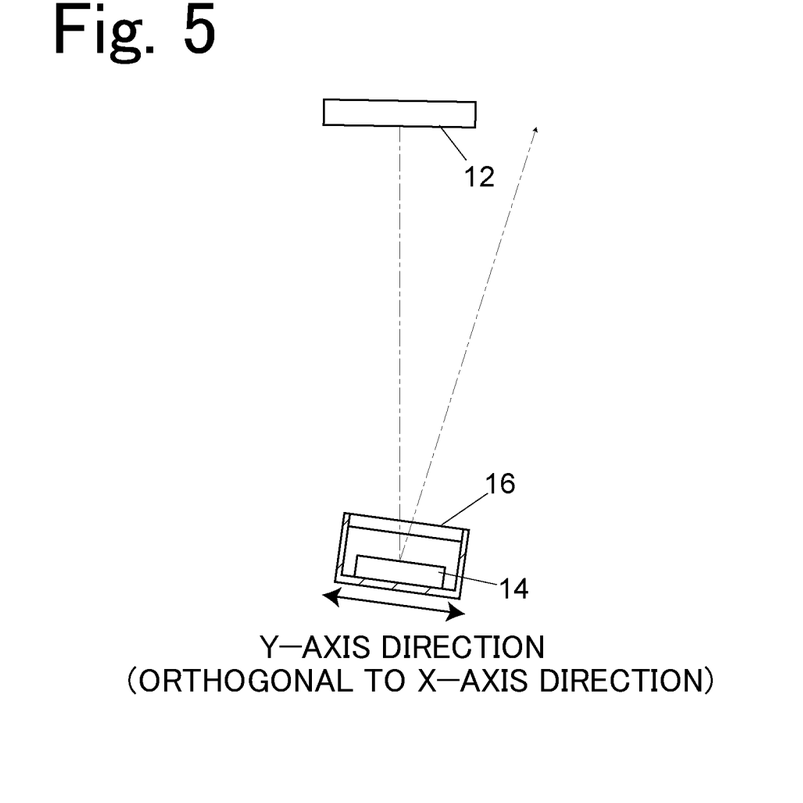
FIG. 5 is a diagram illustrating an example of a preferred positional relationship between the spectroscope and the PDA in a direction (Y-axis direction) orthogonal to the PD array direction.

Then, as illustrated in FIG. 5, the Y-axis direction of the PDA 14 is inclined from the optical axis of the light from the spectroscope 12 to allow light reflected on the light receiving surface of the PDA 14 or the protective plate 16 to deviate from the spectroscope 12. This configuration enables the amount of stray light incident on the PDA 14 to be reduced.

Figure 7:
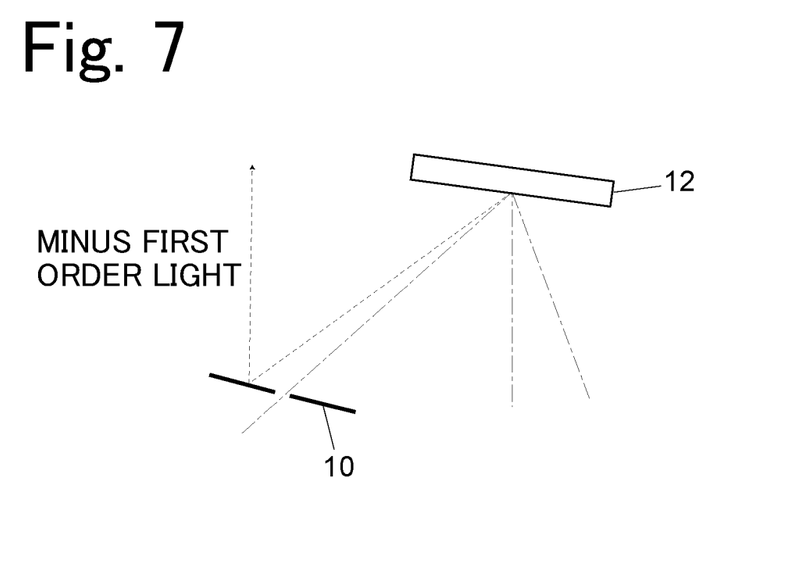
FIG. 7 is a diagram illustrating an example of a preferable placement direction of a slit with respect to the spectroscope.

Further, the present inventors have knowledge that when light such as -first order light generated in the spectroscope 12 is reflected back toward the spectroscope 10 and re-incident on the dispersed light 12, the re-incident light is dispersed to be incident on the PDA 14 and becomes stray light. Then, as illustrated in FIG. 7, a positional relationship between the inlet slit 10 and the spectroscope 12 is adjusted to prevent light reflected on the inlet slit 10 after returning to the inlet slit 10 from the spectroscope 12 from returning to the spectroscope 12 again. Accordingly, the amount of stray light incident on the PDA 14 can be reduced.

The configurations illustrated in FIGS. 5 and 7 can be additionally implemented after the configurations of FIGS. 2 to 4B intended to reduce stray light due to re-reflection on the protective plate 16 is implemented, and can also be implemented independently without implementing the configurations of FIGS. 2 to 4B. The present inventors have found that stray light incident on the PDA 14 is reduced from 0.23% to 0.04% by implementing the configurations of FIGS. 5 and 7 alone, thereby improving linearity of measurement results.

DESCRIPTION OF REFERENCE SIGNS

2: Light source
4: Condenser lens
6: Flow cell
8: Mirror
10: Inlet slit
12: Spectroscope
14: Photodiode array (PDA)
16: Protective plate
18: PDA case
20, 22, 24: Anti-reflection coating

The invention claimed is:

1. A spectrophotometer serving as a liquid chromatograph detector, comprising:
 a light source;
 a flow cell in which a sample flows, the flow cell being disposed in an optical path of light from the light source;
 a spectrometer for dispersing light which passed through the flow cell for each wavelength component;
 a photodiode array provided with a plurality of photodiodes for detecting the amount of incident light, the plurality of photodiodes are aligned in one direction, the photodiode array being disposed to allow light for each of the wavelength components dispersed by the spectroscope to be incident on a light receiving surface of the corresponding one of the photodiodes; and
 an optically transparent protective plate protecting a light receiving surface of the photodiode array,
 a positional relationship between the spectroscope and the photodiode array is set so that a distance between a reflection position of light reflected on the light receiving surfaces of the photodiodes which receive at least lights whose wavelength are from 200 nm to 300 nm, and an incident position at which lights reflected at the reflection position are incident on the light receiving surface of the photodiode array after being re-reflected on the protective plate is equal to or less than a width dimension of any one of the photodiodes constituting the photodiode array, or is equal to or less than minimum spectrum resolution of the spectrophotometer.

2. The spectrophotometer according to claim 1, wherein the positional relationship between the spectroscope and the photodiode array is set so that an optical axis of light whose wavelength is a predetermined wavelength of from 200 nm to 300 nm among light dispersed by the spectroscope is orthogonal to the one direction.

3. The spectrophotometer according to claim 2, wherein the predetermined wavelength is about 250 nm.

4. The spectrophotometer according to claim 1, wherein the positional relationship between the spectroscope and the photodiode array is set so that an optical axis of light dispersed by the spectroscope is inclined from a direction orthogonal to the one direction in a plane of the light receiving surface of the photodiode array to allow light reflected on the light receiving surface of the photodiode array to deviate from the spectroscope.

5. The spectrophotometer according to claim 1, wherein an anti-reflection coating for reducing a reflectance is applied to at least one of the light receiving surfaces of each of the photodiodes, a surface of the protective plate close to the photodiodes, and a surface of the protective plate opposite to the photodiodes.

6. The spectrophotometer according to claim 1, further comprising:

an inlet slit provided in an optical path of light incident on the spectrometer, wherein a positional relationship between the inlet slit and the spectroscope is set so that light from the spectroscope reflected on the inlet slit deviates from the spectroscope.

7. A spectrophotometer serving as a liquid chromatograph detector, comprising:

a light source;

a flow cell in which a sample flows, the flow cell being disposed in an optical path of light from the light source;

a spectrometer for dispersing light which passed through the flow cell for each wavelength component;

a photodiode array provided with a plurality of photodiodes for detecting the amount of incident light, the plurality of photodiodes are aligned in one direction, the photodiode array being disposed to allow light for each of the wavelength components dispersed by the spectroscope to be incident on a light receiving surface of the corresponding one of the photodiodes; and an optically transparent protective plate protecting a light receiving surface of the photodiode array, a positional relationship between the spectroscope and the photodiode array is set so that an optical axis of light whose wavelength is a predetermined wavelength of from 200 nm to 300 nm among light dispersed by the spectroscope is orthogonal to the one direction and an effect of stray light caused by light re-reflected by the protective plate within the wavelength range of from 200 nm to 300 nm is minimized.

8. The spectrophotometer according to claim 7, further comprising:

an inlet slit provided in an optical path of light incident on the spectrometer, wherein a positional relationship between the inlet slit and the spectroscope is set so that light from the spectroscope reflected on the inlet slit deviates from the spectroscope.

* * * * *